United States Patent [19]

Egli et al.

[11] 3,843,265

[45] Oct. 22, 1974

[54] PHOTOMETER FOR DIGITAL INDICATION OF CONCENTRATION

[75] Inventors: Bruno Egli, Rorschach; Niklaus Manser, Goldach, both of Switzerland

[73] Assignee: Labtronic, AG, Zurich, Switzerland

[22] Filed: Apr. 24, 1973

[21] Appl. No.: 353,966

[30] Foreign Application Priority Data
Apr. 25, 1972 Germany............................ 2220204

[52] U.S. Cl.................. 356/201, 250/565, 356/204, 356/223, 356/226
[51] Int. Cl. .......................................... G01n 21/09
[58] Field of Search....... 324/140 R, 99 D; 356/229, 356/226, 215, 223, 201, 204, 205; 250/565, 574

[56] References Cited
UNITED STATES PATENTS

| | | | |
|---|---|---|---|
| 3,543,152 | 11/1970 | Niedereder | 324/99 D |
| 3,617,885 | 11/1971 | Wheable | 324/99 D |
| 3,664,744 | 5/1972 | Liston | 356/206 |

Primary Examiner—Ronald L. Wibert
Assistant Examiner—Conrad Clark
Attorney, Agent, or Firm—Andrus, Sceales, Starke & Sawall

[57] ABSTRACT

A photometer for the digital display of the concentration of a test sample in accordance with the formula $E_A \times F \times 1/E_{St}$ includes signal means generating a time period signal proportional to $E_A \times F$. An adjustable frequency means is also provided and the signal means and adjustable frequency means coupled to a gate for applying the frequency to a digital counter. A register alters the frequency of the adjustable frequency means in accordance with the divisor to cause the digital counter to provide an indication of concentration.

4 Claims, 2 Drawing Figures

PHOTOMETER FOR DIGITAL INDICATION OF CONCENTRATION

BACKGROUND OF THE INVENTION

1. Field of the Invention

The present invention refers to a photometer for the digital indication of concentration of a specimen being analyzed in a cuvette, said photometer having a light source and a photoelectric sensor for ascertaining the light emerging from the test source which has been altered by the absorption properties of the analysis specimen.

2. Description of the Prior Art

Known photometers employ a light source which applies a light beam to a photoelectric sensor. A specimen, or test sample, being analyzed is placed in the light beam and alters the condition of the light beam. The photoelectric sensor provides a voltage proportional to the altered light beam which may be employed as an indication of the absorption properties of the test sample.

Before analyzing the test sample, a comparison, i.e., blank solution, is placed in the light beam and the instrument calibrated either to a maximum or to a null point or balance reading. Thereafter, with the test sample in the light beam, its extinction or absorbance may be read directly on the scale of the instrument.

With known instruments, only the extinction or absorbance of the test sample may be obtained, as in a scalar or digital form. For most chemical analyses the absorbance is not sufficient as it merely indicates the loss of intensity of the light beam.

For many analyses it is important to directly obtain the concentration Conc. of the test sample in percentages. For this purpose the extinction or absorbance E must be multiplied with a factor F. As with absorbance, the concentration Conc. may be established on the basis of the optical properties and null balance of a blank solution. The factor F may be taken out of a table, whereby the completion of the multiplication $E \times F$ for the reading of the concentration Conc. in percentage is made with known photometers.

Other frequent, extensive clinical analyses desire the ascertainment of, for example, urine components, blood sugar, or cholesterol in serum or urine. In order to obtain results with these analyses, the concentration of the test sample Conc. $A = E_A \times F$ ($E_A$ = the absorbance of the test sample) must be compared with a standard solution, through the absorbance or extinction $E_{St}$ of the standard solution. In order to obtain the concentration Conc. St referenced to a standard solution, the values $E_A \times F$ must through the value of the extinction $E_{St}$ of the standard solution be divided. The following mathematical formula must therefore be fulfilled.

Conc. St = $1/E_{St} \times E_A \times F = 1/E_{St} \times$ Conc. A (mg%)

whereby:

Conc. St = concentration of a test sample compared to a standard solution $E_{St}$ = extinction or absorbance of standard solution F = factor for determination of concentration $E_A$ = extinction or absorbance of the test sample to be analyzed Conc. A = concentration of the analyzed sample without reference to the standard solution The carrying out of this division through $E_{St}$ in order to obtain a result in the form of a concentration from a standard reference is, with known photometers, only possible with calibration curves, slide rules, or other aids. The additional calculation of the end result may distort the measurement and also often gives rise to mathematical errors.

SUMMARY OF THE PRESENT INVENTION

The purpose of the present invention is to provide a means for ascertaining the concentration of a test sample as compared with a standard solution without the need for ancillary aids such as the calibration curves or calculating means. More particularly, a purpose of the present invention is to provide a means suitable for medical and chemical requirements and utilizing the calculation, Conc. St. = $1/E_{St} \times E_A \times F$, whereby the value $E_A \times F$ will be simply and quickly divided by the value $E_{St}$ and the results digitally displayed.

These purposes are obtained in the following manner. With a blank solution a null point is carried out in the photometer and, in a known manner, the value of the extinction of the analyzed sample $E_A$ is obtained. This ascertainment occurs through the charging of a capacitor means with the voltage of a photoelectric sensor illuminated by a comparison light beam. The capacitor begins to discharge over a resistance, whereby the time $t$ passes along the discharge curve until a voltage corresponding to that of a photoelectric sensor illuminated by the light beam passing through the analysis sample is reached. The time so established corresponds to the quantity $E_A$. The resistance over which the capacitor discharge takes place is variable, thereby to provide a factor $F$, so that the value $E_A \times F$ becomes available in a known manner. The value $E_A \times F$ thus corresponds to the time needed for the capacitor to discharge to the measuring light beam photoelectric sensor voltage.

This time $t$ provides a voltage impulse of the duration $t$ which, when applied to a gate element, opens the element for a similar time $t$ and applies a signal of 10 kilohertz to a digital counter to be counted.

The value $E_A \times F$ will also be registered during the time $t$ as the quantity $t \times 10$ kilohertz number of impulses.

For indicating a concentration which is compared with a standard solution, the solution, in a cuvette, is placed in the measuring light beam and the optical properties, i.e., the extinction $E_{St}$ registered in a binary counter. At a following measurement of the concentration Conc. of a test sample, the stored values influence a frequency divider so that during the time duration $t$ a frequency of 10 kilohertz is no longer provided to the digital counter, but rather another frequency in accordance with the extinction $E_{St}$ is provided. By the division of $E_A \times F$ through $E_{St}$, with the value $E_{St}$ greater than 1, there is counted slower in the digital counter a number of counting pulses, corresponding to $t \times f$ where $f < 10$ kilohertz. On this basis, with a value of $E_{St}$ which is smaller than 1, the frequency division goes in accordance with faster impulses at the input of the digital counter. One can easily see that through this technique for the division of quantities, great advantages in the employment of photometers result. Calibrating curves and other calculating aids may be eliminated. The indication appears as a direct digital reading so that reading mistakes are also precluded.

DESCRIPTION OF THE PREFERRED EMBODIMENT

Figure 1:
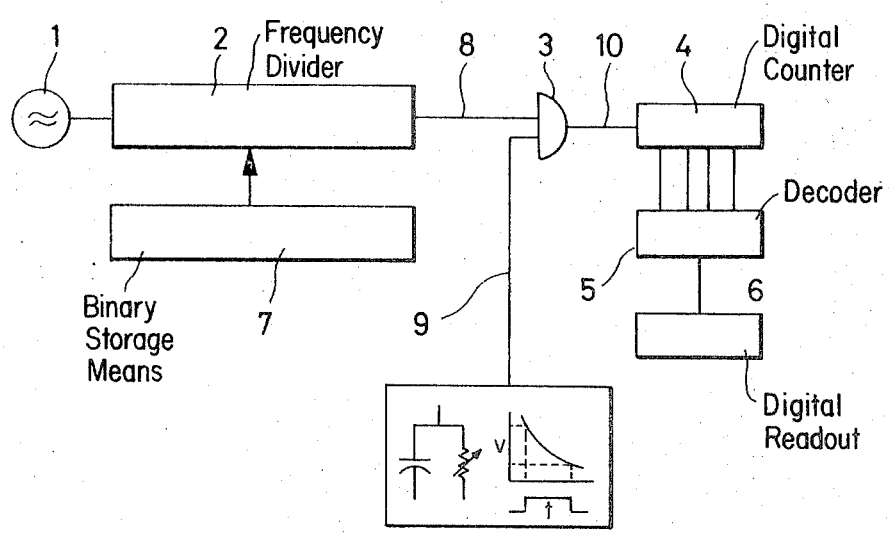
FIG. 1 is a simplified block diagram of the apparatus for division or quotient forming.

In FIG. 1, a base frequency oscillator 1, with a frequency of 10 megahertz operates a controllable frequency divider 2. Via gate 3 runs the divided output frequency of 10 kilohertz of the controllable frequency divider 2 to a counter 4 of a digital display counter, from which in a well known manner, via register and decoder 5, a digital readout terminal 6 will be controlled.

Figure 2:
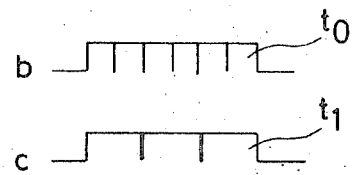
FIGS. 2a through 2c show the signals at the input and output of the gate for controlling the digital counter.

As the concentration measurement Conc. is not now compared with a standard solution, the register 7 has a value 1, that is, a base value, and the controllable frequency divider will not be influenced. At output 8 of controllable frequency divider 2, a frequency of 10 kilohertz is available and applied to the input of gate 3. To provide readout, a value $E_A \times F$ may be provided as the representative impulse duration $t$ of FIG. 2a which is applied to gate 3 by conductor 9. During the duration $t$, both impulses are applied at the input of gate 3. The gate opens and the impulses run with a total count of $t \times 10$ kilohertz via input 10 to the digital counter 4 from which the readout is taken by means of the readout terminal 6. In FIG. 2b, the impulses 10 are shown relative to the frequency of 10 kilohertz. The impulse duration $t$ will thus with a frequency of 10 kilohertz be divided to provide a number of $t \times 10$ kilohertz impulses, thereby the impulse width of the individual impulses to aggregate.

Should a concentration according to the formula $E_A \times F$ through $E_{St}$ be indicated, the customary null balance may be obtained from a blank solution in the cuvette. A standard solution is added and the measuring light beam applied. The optical value of the standard solution may be measured and stored in storage means 7 by pressure keys. The standard solution may then be removed and the sample to be analyzed placed in the light beam.

The storage means 7 influences controllable frequency divider 2 corresponding to its registered value $E_{St}$ so that at the output 8 thereof appears a frequency different than 10 kilohertz. The gate 3 will again during the impulse period $t$ be opened, via its input 9, to correspond to a value $E_A \times F$. At the output of the gate, i.e., at the input of digital counter 4, appears the part ratio impulse of FIG. 2c having an impulse width of $t_1$. One can recognize from FIGS. 2b and 2c that the readout of digital counter 4 now appears only half of the impulses provided by the signal in FIG. 2b thereby obtaining a division by 2 corresponding to the stored value $E_{St}$ in storage means 7 which corresponds to the optical properties of the standard solution.

The operation of the equipment lends itself to operation by a single control. The equipment works according to the formula $E_A \times F E_{St}$ and the frequency divider is so controlled by the storage means that the output frequency which is provided to the digital counter corresponds to the value $1/E_{St}$. There thus appears the resultant of the value $E_A \times F$ divided through $E_{St}$ in the readout field 6 of digital counter 4. A concentration which is not compared to a standard solution can be read out by operation of a single control "$E_A \times F$."

With controls "$E_A \times F$" and "$E_A \times F\ E_{St}$" the frequency divider is controlled either directly out of a base value (1.000), with control "$E_A \times F$," or out of the storage value $E_{St}$ with control "$E_A \times F\ E_{St}$."

Various modes of carrying out the invention are contemplated as being within the scope of the following claims particularly pointing out and distinctly claiming the subject matter which is regarded as the invention.

We claim:

1. A photometer for the digital display of the concentration Conc. St of a test sample with respect to a standard solution in accordance with the formula Conc. St $= E_A \times F \times 1/E_{St}$ where $E_A$ is the extinction of the test sample, $F$ is a concentration determining factor and $E_{St}$ is the extinction of a standard solution comprising:
   a signal generating means providing a time period proportional to $E_A \times F$;
   a base frequency oscillator;
   an electrically adjustable frequency divider coupled to said base oscillator for providing an adjustable frequency pulse signal;
   a coincidence gating means, said adjustable frequency divider and said signal generating means being connected to inputs of said gating means for providing adjustable frequency pulses at the output thereof during the time period;
   digital counting means coupled to the output of said gating means and operable by said adjustable frequency pulses for totalizing and recording the pulses received during the time period proportional to $E_A \times F$; and
   an adjustable storage means for receiving and storing an electrical indication of $E_{St}$, said means being coupled to said adjustable frequency divider for electrically altering the frequency of the adjustable frequency pulse signal and the provision of pulses to said digital counting means in accordance with the stored indication of $E_{St}$ to provide a digital counting means recording corresponding to $1/E_{St}$ $E_A \times F$ and the test solution concentration Conc St. with respect to a standard solution.

2. The photometer of claim 1 wherein the adjustable storage means is further defined as a binary storage means capable of electrically controlling the dividing operation of the adjustable frequency divider and the frequency of the output pulses responsive to the stored electrical indication.

3. The photometer of claim 1 wherein said signal generating means includes a capacitor having a discharge characteristic proportional to $E_A$ and means for altering the discharge characteristic in accordance with $F$, to provide a signal having a time period proportional to $E_A \times F$.

4. The photometer of claim 1 wherein said digital counting means includes a digital counter coupled to said coincidence gating means and a decoder and readout means coupled to said digital counter.

* * * * *

UNITED STATES PATENT OFFICE
CERTIFICATE OF CORRECTION

Patent No. 3,843,265  Dated October 22, 1974

Inventor(s) BRUNO EGLI and NIKLAUS MANSER

It is certified that error appears in the above-identified patent and that said Letters Patent are hereby corrected as shown below:

Col. 3, line 64    After "formula" delete "$E_A \times F\ E_{st}$" and substitute therefor --- $E_A \times F/E_{st}$ ---

Col. 4, line 7    Delete "$E_A \times F\ E_{st}$" and substitute therefor --- $E_A \times F/E_{st}$ ---

Col. 4, line 10   Delete "$E_A \times F\ E_{st}$" and substitute therefor --- $E_A \times F/E_{st}$ ---

Signed and sealed this 28th day of January 1975.

(SEAL)
Attest:

McCOY M. GIBSON JR.
Attesting Officer

C. MARSHALL DANN
Commissioner of Patents